(12) United States Patent
Tillotson (10) Patent No.: US 8,899,012 B1
(45) Date of Patent: Dec. 2, 2014

(54) METHODS AND SYSTEMS FOR FLUX DISTRIBUTION WITHIN A HEAT EXCHANGER

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 13/296,909

(22) Filed: Nov. 15, 2011

(51) Int. Cl.
*F24J 2/24* (2006.01)
*B01J 19/12* (2006.01)
*F03H 1/00* (2006.01)
*B63H 11/00* (2006.01)

(52) U.S. Cl.
USPC ....... 60/204; 165/146; 204/157.41; 60/203.1; 126/663

(58) Field of Classification Search
USPC .......... 60/203.1; 204/157.41, 157.61, 157.22, 204/158.2, 158.21; 126/651, 658, 663, 664, 126/666, 670, 674, 675; 165/146
See application file for complete search history.

(56) References Cited

U.S. PATENT DOCUMENTS

| | | | |
|---|---|---|---|
| 4,577,461 A * | 3/1986 | Cann | 60/203.1 |
| 4,939,976 A | 7/1990 | Minovitch | |
| 6,343,464 B1 * | 2/2002 | Westerman et al. | 60/203.1 |
| 6,459,205 B1 | 10/2002 | Schall et al. | |
| 2009/0107489 A1 * | 4/2009 | Gee et al. | 126/646 |
| 2010/0078425 A1 * | 4/2010 | Wang et al. | 219/538 |

OTHER PUBLICATIONS

Kare, Jordin T. "Near-Term Laser Launch Capability: The Heat Exchanger Thruster." AIP Conference Proceedings 664.1 (2003): 442. Academic Search Premier. Web. Dec. 23, 2013.*
Kare, Jordin T. "Modular Laser Options for HX Laser Launch." AIP Conference Proceedings 766.1 (2005): 128-139. Academic Search Premier. Web. Dec. 27, 2013.*
Kare, Jordin T. "Development Programs for the Heat Exchanger Thruster and HX Laser Launch System." AIP Conference Proceedings 702.1 (2004): 251-262. Academic Search Premier. Web. Dec. 23, 2013.*
Laser Propulsion; http://en.wikipedia.org/wiki/Laser_propulsion#Heat_Exchanger_.28HX.29_Thruster; Oct. 21, 2011; 4 pages.

* cited by examiner

*Primary Examiner* — Gerald L Sung
*Assistant Examiner* — Scott Walthour
(74) *Attorney, Agent, or Firm* — Armstrong Teasdale LLP (57) ABSTRACT

A method to enhance efficiency of a propellant heat exchanger is described. The method includes spacing a plurality of propellant tubes of the propellant heat exchanger within defined flux bins, the flux bins defined as a function of total beam energy to be received by the propellant tubes, the propellant tube spacing resulting in each defined flux bin operable to receive a substantially equal amount of beam energy, and configuring each flux bin such that any beam energy that impinges the flux bin is directed to the propellant tube therein.

20 Claims, 6 Drawing Sheets

METHODS AND SYSTEMS FOR FLUX DISTRIBUTION WITHIN A HEAT EXCHANGER

BACKGROUND

The field of the disclosure relates generally to distribution of flux from a power beam, and more specifically, to methods and systems for improving flux distribution for an optical heat exchanger.

Most modern spacecraft or aircraft rely on chemical propulsion, for example, the burning of a fuel and oxidizer to produce both energy and reaction mass. Various engine designs are used to convert this energy and reaction mass into thrust. Performance of these propulsion schemes is limited by the energy of chemical reactions and by the molecular mass of the reaction products, e.g., $H_2O$ and $CO_2$.

Alternative approaches have been examined and, increasingly, implemented. These frequently use a non-chemical energy source, such as an external beam of electromagnetic energy, to heat the propellant. By eliminating the need for combustion, the propellant can be chosen to have low molecular mass, and therefore a higher exhaust speed for a given temperature. Since engine materials are limited by the peak temperature at which they can operate, the beamed energy approach allows higher exhaust speed (and therefore higher specific impulse) than chemical propulsion.

In the operation of a beam-powered rocket vehicle and a beam source, a key component of the system is the beam receiver. This component collects the beam and transfers its energy into the propellant as heat. The specific device for the transfer of energy into the propellant as heat within the rocket vehicle is a heat exchanger laser thruster. In this regard, a beam of electromagnetic energy (typically a laser beam) impinges on a set of tubes disposed within the heat exchanger. The tubes are typically arranged on a flat plate and are evenly spaced. Outer surfaces or walls of the each tube absorbs the electromagnetic energy as heat and transfers the heat to the propellant. Each tube then carries a fraction of the propellant that flows from a tank into the nozzle of an engine as heated propellant.

BRIEF DESCRIPTION

In one aspect, a method to enhance efficiency of a propellant heat exchanger is provided. The method includes defining a plurality of flux bins as a function of total beam energy to be received by the propellant heat exchanger, a configuration of each flux bin resulting in each defined flux bin operable to receive a substantially equal amount of energy from a beam, disposing a plurality of propellant tubes of the propellant heat exchanger within the defined flux bins, each propellant tube in a corresponding flux bin, and configuring each flux bin such that any beam energy that impinges the flux bin is directed to the propellant tube therein.

In another aspect, a vehicle is provided that includes a beam receiver configured to collect a beam from a beam source, a heat exchanger comprising a plurality of propellant tubes accessible via the beam receiver, and a propellant configured to flow from a tank, through the propellant tubes for heating of the propellant from the beam energy, and into a nozzle of an engine as a heated propellant. The plurality of propellant tubes are placed within defined flux bins having a mechanism operable to transfer energy into a corresponding propellant tube such that each tube of the plurality of propellant tubes receives a substantially equal amount of beam energy via said beam receiver.

In still another aspect, a propellant heat exchanger is provided that includes a beam receiver, a plurality of propellant tubes accessible via the beam receiver, and at least one device associated with each propellant tube. The at least one device is operable for transferring beam energy to the associated propellant tube, the plurality of propellant tubes and each associated at least one device placed within the heat exchanger such that each propellant tube is configured to receive a substantially equal amount of beam energy via the beam receiver.

The features, functions, and advantages that have been discussed can be achieved independently in various embodiments or may be combined in yet other embodiments further details of which can be seen with reference to the following description and drawings.

DETAILED DESCRIPTION

Figure 1:
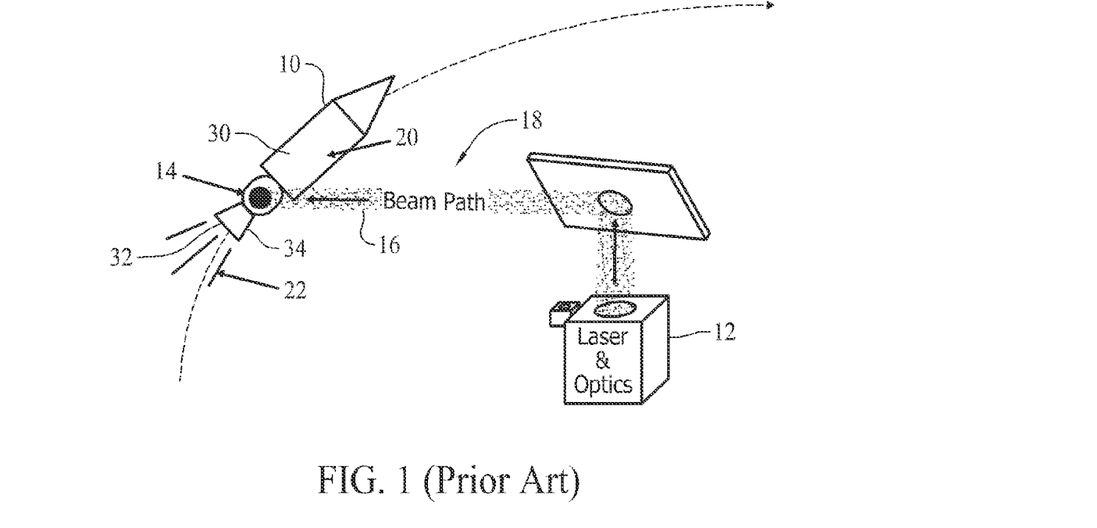
FIG. 1 illustrates schematically operation of an exemplary known beam-powered rocket vehicle and a beam source.

FIG. 1 illustrates schematically the operation of a beam-powered rocket vehicle 10 using a beam source 12. Beam-powered rocket vehicle 10 includes a beam receiver 14 that collects a beam 16 from beam source 12 that is transmitted along a beam path 18 and transfers its energy into the propellant 20 within the vehicle 10 as heat, thereby producing a hot propellant exhaust 22. In this system, the beam 16 of electromagnetic energy (typically a laser beam) impinges on a set of tubes (not shown) accessible via the beam receiver 14. The tubes are typically arranged on a flat plate and are evenly spaced such that each tube carries a fraction of the propellant 20 that flows from a tank 30 into the nozzle 32 of an engine 34. Outer surfaces or walls of the tubes absorb the electromagnetic energy as heat and transfers the heat to the propellant 20 to generate the hot propellant exhaust 22.

The described embodiments are directed to a method for creating and using a beam-to-fluid heat exchanger that improves on the basic heat exchanger laser thruster described with respect to FIG. 1. As described herein, the method includes estimating the mean spatial distribution of beam intensity at the beam-powered vehicle, dividing a beam receiver surface into segments that receive roughly equal flux, and correspond to economical routes for propellant tubes. The method further includes providing a heat exchanger with one propellant tube in each segment. In operation, the heat exchanger is installed in a vehicle and a beam is transmitted that impinges on the heat exchanger in accordance with the estimated spatial distribution.

To support such a method, a beam receiver includes propellant tubes that absorb radiation corresponding to the wavelength of the beam, and an energy collecting apparatus associated with each propellant tube. The propellant tubes and the energy collecting apparatus are configured so that each propellant tube receives roughly equal flux from an impinging power beam.

The described beam receiver supports a beam-powered vehicle system that includes the aforementioned beam receiver attached to a beam-powered vehicle, and a beam source configured to transmit a beam to the beam receiver of suitable geometry, intensity, and wavelength.

Figure 2:
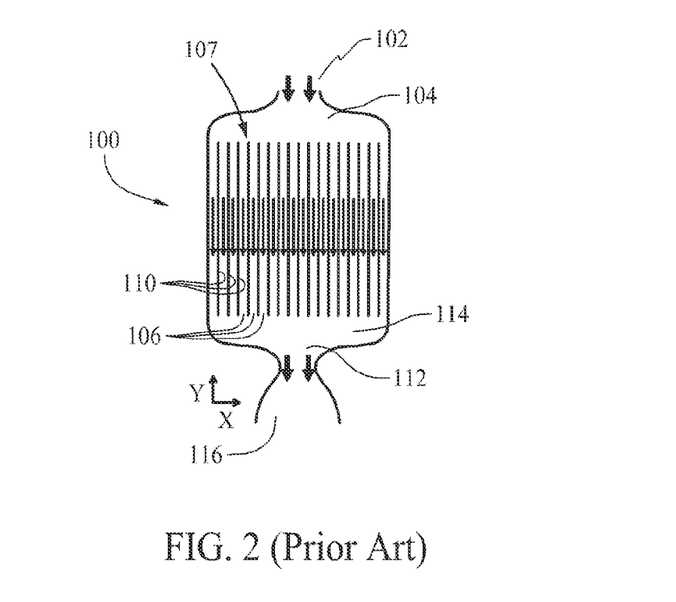
FIG. 2 is an illustration of an exemplary known heat exchanger laser thruster.
Figure 3:
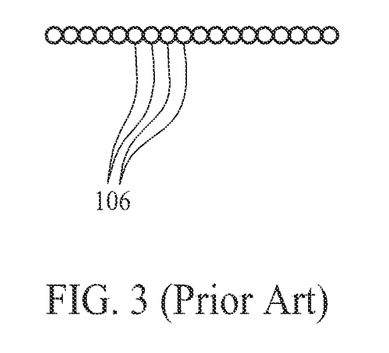
FIG. 3 is a cross-section view of propellant tubes of the exemplary known heat exchanger laser thruster of FIG. 2.

FIG. 2 illustrates a heat exchanger laser thruster 100 and FIG. 3 is a cross-section of the propellant tubes 106 of FIG. 2. Propellant 102 from a tank (not shown) flows into the inlet manifold 104. The flow is divided equally among a plurality of evenly spaced propellant tubes 106 each having approximately equal length and generally disposed to form substantially rectangular beam-absorbing surface 107. The propellant 102 flows in parallel through the multiple propellant tubes 106, which are heated by an energy beam (not shown) impinging on a heat exchanger (not shown). The propellant 102 is heated as the propellant absorbs energy from the walls 110 of the propellant tubes 106. The heated propellant 112 exits the propellant tubes 106 passing through an outlet manifold 114, ultimately passing through a nozzle 116 configured to transform the heat energy of the heated propellant 112 into bulk kinetic energy.

Figure 4:
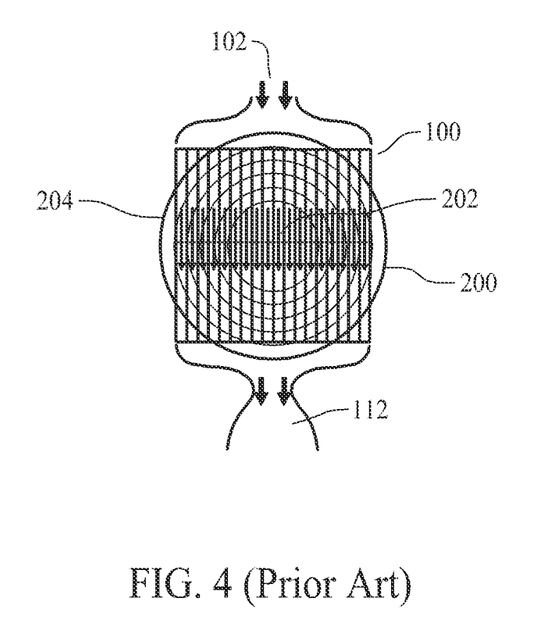
FIG. 4 shows a typical known beam pattern incident on the heat exchanger laser thruster of FIG. 2.

FIG. 4 shows a typical laser beam pattern 200 incident on the heat exchanger laser thruster 100 of FIG. 2. In contrast to the rectangular shape formed by the propellant tubes 106 shown in FIG. 2, the laser beam pattern 200 shown in FIG. 4 has a generally circular configuration. As such, the laser beam pattern 200 is more intense in the center 202 and relatively less intense at the edges 204 with the resulting net effect of the beam shape and intensity profile being shown in FIG. 5. Plot 250 illustrates the total heat flux on each propellant tube 106 of the plurality of propellant tubes, integrated along the y-direction from a point where propellant 102 enters the propellant tube 106 to a point where heated propellant 112 propellant exits the propellant tube 106.

Figure 5:
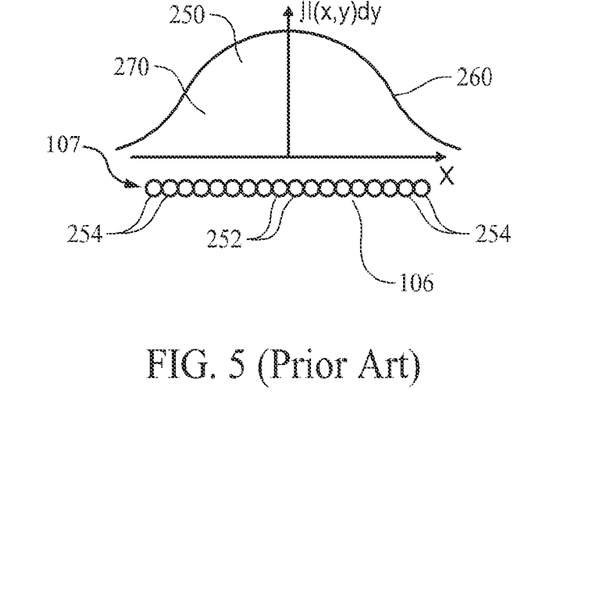
FIG. 5 graphically illustrates a net effect of the exemplary known beam shape and intensity profile resulting from the beam pattern of FIG. 4.

As can be discerned from FIGS. 4 and 5, one or more propellant tubes 106 disposed along a centerline of the heat exchanger (i.e. where x is near zero) are illuminated by the beam 16 along the entire length of the propellant tube 106, and are exposed to a more intense part of the beam 16. As such, the center tubes 252 absorb a great deal of heat and transfer that heat to propellant passing through that tube. In contrast, propellant tubes 106 (i.e., edge tubes 254) disposed along an edge of the heat exchanger are exposed to relatively weaker parts of the beam 16 and are illuminated by the beam 16 on only a portion or part of the entire length of the tube 106. As such, the edge tubes 254 absorb and transfer a relatively moderate amount of heat to propellant 102 passing through the tube when compared to the center tubes 252. This uneven distribution of heat to propellant flowing through different tubes in the heat exchanger hinders or minimizes performance as a specific impulse of a rocket or jet engine is roughly proportional to the square root of the propellant's mean absolute temperature at the outlet manifold. Ideally, the propellant temperature should be as high as possible.

Peak allowable temperature is constrained by the melting point of the tube material. Typically, the beam source and the vehicle's flight path are chosen so the beam flux on the hottest propellant tube does not cause the tube to exceed this temperature limit at any point in the flight. The hottest tubes are those that receive the highest beam flux (e.g. the center tubes 252 near the peak of the curve 260 as shown in FIG. 5). Tubes other than the center tubes 252 receive a relatively lower heat flux, and therefore do not heat propellant to the same high temperature as the hottest tubes.

The result is that when propellant from all tubes mixes together in the outlet manifold 114, the mean temperature is substantially lower than the peak allowable temperature. Therefore, specific impulse is lower than it would be if all propellant could reach the peak allowable temperature. Lower specific impulse results in the vehicle needing more propellant to achieve its mission than if the same propellant was able to obtain peak allowable temperature. More propellant results in bigger tanks, more mass, more required power, bigger beam source, and an increase in the cost of building the system and flying a mission.

The following paragraphs and referenced figures describe a configuration that provides a more uniform distribution of flux (and therefore of heat) among propellant tubes, which enables a higher mean temperature in the outlet manifold, and translates into higher specific impulse and lower overall cost.

The plot 250 that includes curve 260 in FIG. 5 was described above as showing the total flux along each propellant tube 106. The curve 260 can also be thought of as showing the total flux along each straight path across the heat exchanger's surface 107, from the inlet end to the outlet end, as a function of the path's lateral position in the heat exchanger. This is a more abstract view; instead of flux on the tube, it is thought of as flux at the position of the propellant tube.

Figure 6:
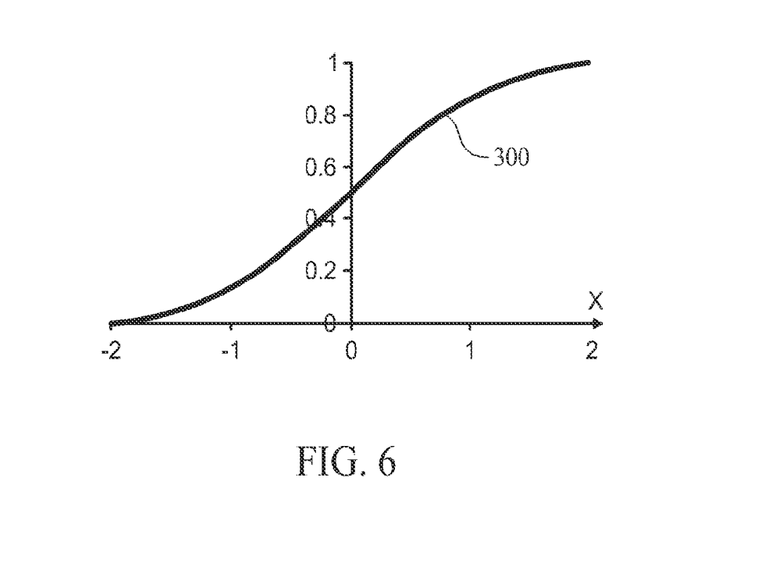
FIG. 6 is an example cumulative distribution function of beam energy flux based on the beam shape and intensity profile of FIG. 5.

If the area 270 under the curve 260 is integrated from one side of the heat exchanger to the other, the total flux on the heat exchanger surface 107 is obtained. If an integration is performed from one side of the heat exchanger to various points, x, across the heat exchanger, a cumulative distribution function is obtained that illustrates the total flux between the first side and point x. FIG. 6 is an example of such a cumulative distribution function 300. It should be noted that the flux distribution used to generate FIG. 6 may be different from the flux distribution used to generate the example plot 250 of FIG. 5.

Figure 7:
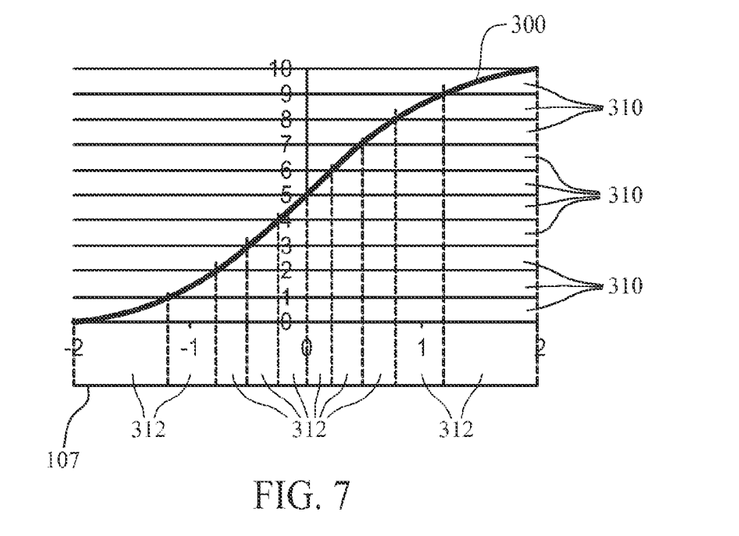
FIG. 7 illustrates the total beam energy flux resulting from the beam pattern of FIG. 4 partitioned into approximately equal-sized flux bins.

As shown in FIG. 7, the total flux is partitioned into equal-sized horizontally-oriented bins 310. An example is shown by the horizontal grid lines labeled 0 to 10 in FIG. 7 that partition the total flux (i.e. highest value on the vertical axis) into 10 equal-sized bins 310. The value 10 was chosen for convenience of illustration.

Having partitioned the flux (vertical axis) into equal-sized bins 310, the fraction of heat exchanger surface 107 (horizontal axis) assigned to each bin 310 is then defined. Such definition is accomplished, in one embodiment, by drawing vertical lines downward from each point where a horizontal grid line crosses the cumulative distribution function 300 to heat exchanger surface 107, as illustrated by the vertical dashed lines in FIG. 7.

Figure 8:
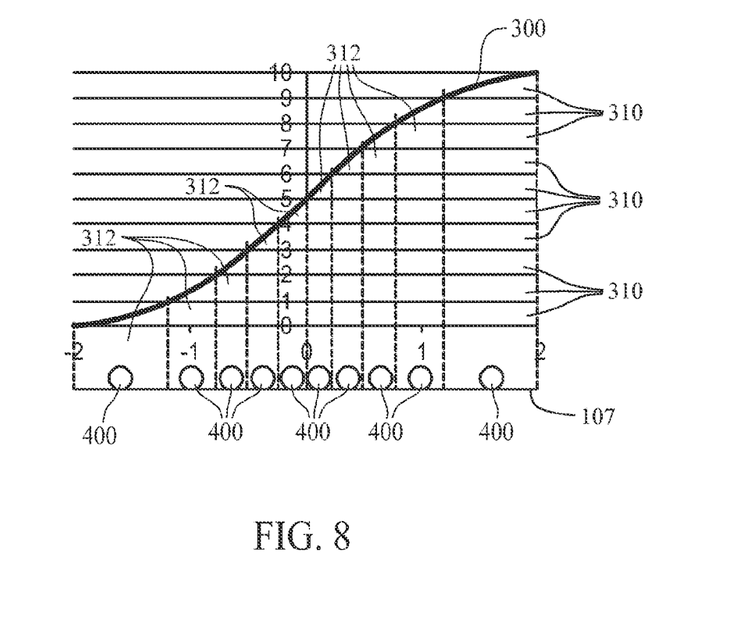
FIG. 8 illustrates assignment of one propellant tube to each flux bin of FIG. 7.

The area between each adjacent pair of vertical dashed lines receives approximately the same total flux as the area between any other adjacent pair of dashed vertical lines, and each such area may be referred to as a vertically-oriented flux bin 312. From an abstract perspective, the process of partitioning the total flux and mapping equal portions to each of N flux bins 312 is conceptually similar to the process for defining percentiles or quartiles in a probability distribution. Pertinent to the embodiments described herein, one propellant tube 400 is assigned to each flux bin 312, as illustrated in FIG. 8.

Figure 9:
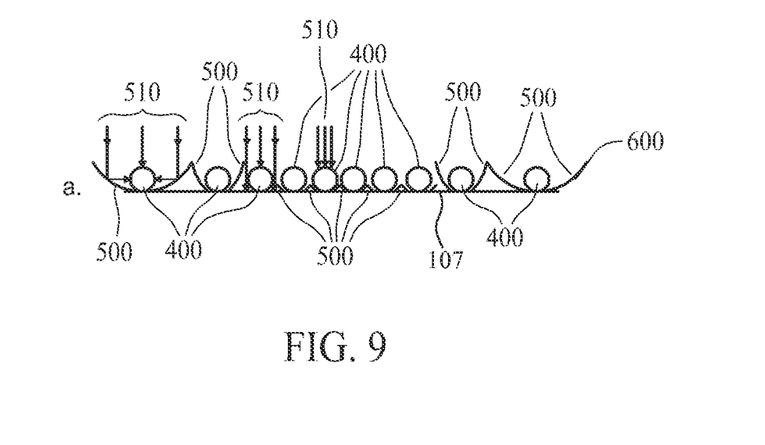
FIG. 9 illustrates reflective optical surfaces configured to reflect beam energy that strikes within a given flux bin toward the propellant tube within the flux bin.
Figure 10:
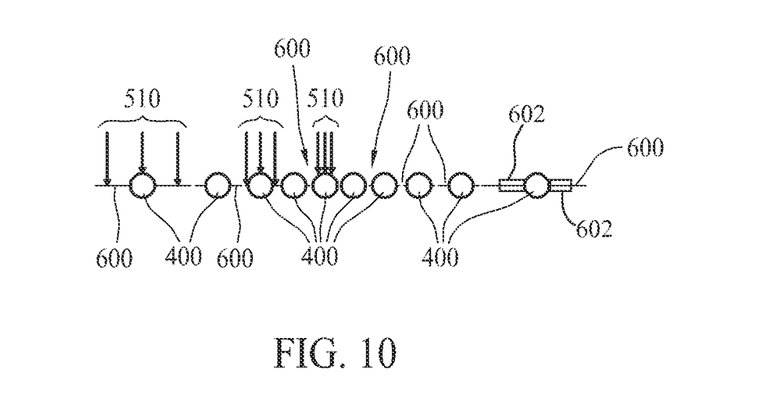
FIG. 10 illustrates heat conducting plates configured to absorb beam energy that strikes within a given flux bin and thermally conduct the generated heat to the propellant tube within the flux bin.

Once the proper distribution of propellant tubes 400 is defined, various embodiments may be utilized to collect energy in each flux bin 312 and transfer the energy into the corresponding propellant tube 400. FIGS. 9 and 10 illustrate two such embodiments.

In FIG. 9, reflective optical surfaces 500 are configured so beam energy 510 that strikes the reflective optical surface within a given flux bin is reflected toward the propellant tube 400, which then absorbs the beam energy.

In FIG. 10, heat conducting plates 600 are configured so beam energy 510 that strikes the heat conducting plate within a given flux bin is absorbed by the heat conducting plate 600 and thermally conducted to the associated propellant tube 400. One embodiment of thermal conduction may include heat pipes 602.

FIG. 8 generally shows that as the propellant tubes 400 move from the edge of the heat exchanger to the center of the heat exchanger the size of the corresponding flux bin along the "x" axis gets smaller based on the beam being more intense at its center. As a result, the reflective size of the reflective optical surfaces 500 and heat conducting plates 600 likewise are also smaller toward the center of the heat exchanger as less heat is needed to be conducted towards the propellant tubes 400 towards the center of the configuration.

Due to the reflective optical surfaces 500 and the heat conducting plates 600 that define the flux bins in the embodiments described with respect to FIGS. 9 and 10, each propellant tube receives approximately the same amount of flux as any other propellant tube within the heat exchanger. In this regard, the spacing of the flux bins may be defined as a function of the total beam energy to be received by the propellant tubes with the propellant tube spacing within each flux bin resulting in each flux bin operable to receive a substantially equal amount of beam energy.

Propellant passing through any given tube exits that tube at about the same temperature as propellant passing through any other tube. As such, the system can be configured such that the propellant exiting from each propellant tube is close to the peak allowable temperature. As a result, the specific impulse is as high as it may be within the constraint of material melting points. As such, less propellant is needed to achieve the mission. Less propellant results in smaller tanks, lower mass, less required power, smaller beam source, and reduced costs.

The combination of reflective optical surfaces 500 and heat conducting plates 600 and any other approaches for gathering beam energy within a flux bin and implementing the selected approach, may be determined by, among other things, the technical and economic constraints of each application.

Figure 11:
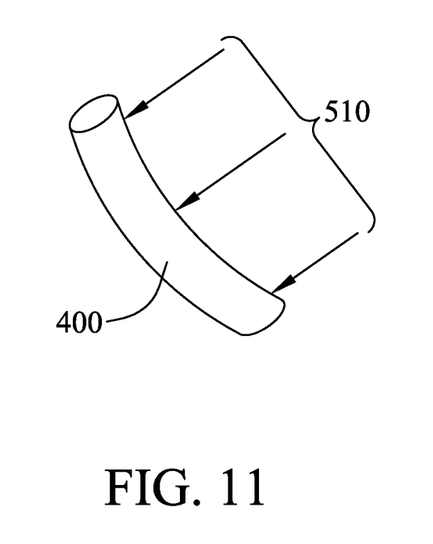
FIG. 11 illustrates an exemplary propellant tube having a curved path.

Examples of the heat exchanger described herein are presented for illustrative purposes and are not intended to be inclusive as persons of ordinary skill in the art will understand that various modifications to among other things, size, shape, etc., of the heat exchanger are intended to be included within the scope of the subject matter disclosed herein. For example, it may be desirable to create a beam receiver with a circular or oval shape and with tubes that follow a variety of curved paths, as shown in FIG. 11. However, in any such application, it will be understood by those skilled in the art that it may be appropriate to perform the steps described herein and corresponding to FIGS. 6-10 at more than one position between the inlet manifold and the outlet manifold. In any configuration, the focus remains the distribution of the propellant tubes and configuration of the associated beam-collecting surfaces at each position between the inlet manifold and the outlet manifold so that each propellant tube receives roughly the same total flux along its entire length as every other propellant tube.

For clarity, the process is described above as using graphical methods. Those skilled in the art will appreciate that numerical or empirical methods may be used to achieve the same end.

The embodiments have been described in the context of a rocket, where the propellant flows from a tank. It will be appreciated by those skilled in the art that a similar approach may be used in an airplane where the propellant is air ingested by a compressor, or in a marine vessel (ship or submarine) where the propellant is water ingested by a pump or turbine. In a specific example, the described embodiments may be utilized in a beam-powered jet engine for unmanned aerial vehicles (UAVs). The propellant utilized in such UAVs may likely air. Such an engine would enable nearly unlimited endurance for a large, high altitude UAV.

At least one known heat exchanger laser thruster uses evenly distributed propellant tubes. The described embodiments space the propellant tubes and provide a beam-collection apparatus to collect flux that arrives in the space between the propellant tubes. The tubes and apparatus are configured so that each propellant tube and its associated apparatus receive approximately the same amount of flux as any other propellant tube and associated apparatus.

In one embodiment, technical effects of the methods and systems described herein include at least one of: (a) spacing a plurality of propellant tubes of the propellant heat exchanger within defined flux bins, the flux bins defined as a function of total beam energy to be received by the propellant tubes, the propellant tube spacing resulting in each defined flux bin operable to receive a substantially equal amount of beam energy, and (b) configuring each flux bin such that any beam energy that impinges the flux bin is directed to the propellant tube therein.

As used herein, an element or step recited in the singular and proceeded with the word "a" or "an" should be understood as not excluding plural elements or steps unless such exclusion is explicitly recited. Furthermore, references to "one embodiment" or the "exemplary embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method to enhance efficiency of a propellant heat exchanger, said method comprising:
positioning a plurality of propellant tubes along a beam receiving surface of the propellant heat exchanger, wherein the plurality of propellant tubes are oriented such that a spacing between adjacent tubes of the propellant tubes varies along the beam receiving surface such that each propellant tube receives approximately the same amount of beam energy, wherein the plurality of propellant tubes are configured to channel a propellant therethrough to facilitate heating the propellant, with the beam energy, to produce a hot propellant exhaust in an engine nozzle; and coupling a mechanism to at least one of each of the propellant tubes and to the beam receiving surface, wherein the mechanism is operable to transfer beam enemy into the at least one of each of the propellant tubes.

2. The method according to claim 1 wherein coupling a mechanism to at least one of each of the propellant tubes and to the beam receiving surface comprises coupling at least one reflective optical surface to at least one of each of the propellant tubes and to the beam receiving surface, wherein the at least one reflective optical surface is oriented so that any beam energy that strikes the at least one reflective optical surface is reflected toward the corresponding propellant tube for absorption.

3. The method according to claim 1 wherein coupling a mechanism to at least one of each of the propellant tubes and to the beam receiving surface comprises coupling at least one heat conducting plate to each propellant tube, wherein the at least one heat conducting plate is oriented so that any beam energy that strikes the at least one heat conducting plate is absorbed by the heat conducting plate and thermally conducted to the corresponding propellant tube for absorption.

4. The method according to claim 3 further comprising utilizing at least one heat pipe for thermally conducting the beam energy to at least one of the plurality of propellant tubes.

5. The method according to claim 1, wherein positioning a plurality of propellant tubes along a beam receiving surface further comprises:
determining a total beam energy along a straight path across the beam receiving surface of the heat exchanger as a function of a lateral position of the path with respect to the heat exchanger;
integrating the total beam energy from a first side of the heat exchanger to various points, x, along the straight path across the beam receiving surface of the heat exchanger to obtain a cumulative distribution function that describes the total beam energy between the first side and the various points x.

6. A vehicle comprising:
a beam receiver configured to collect a beam from a beam source;
a heat exchanger comprising a plurality of propellant tubes accessible via said beam receiver, said plurality of propellant tubes positioned along a beam receiving surface of said heat exchanger such that a spacing between adjacent tubes of said plurality of propellant tubes varies along said beam receiving surface, wherein each tube of said plurality of propellant tubes comprises a mechanism operable to transfer beam energy into said propellant tube such that each tube of said plurality of propellant tubes receives a substantially equal amount of beam energy via said beam receiver; and
a propellant configured to flow from a tank, through said plurality of propellant tubes for heating of said propellant from the beam energy, and into a nozzle of an engine as a heated propellant.

7. The vehicle according to claim 6, wherein said mechanism comprises at least one reflective optical surface coupled to at least one of said beam receiving surface and to said propellant tube, said at least one reflective optical surface configured so that any beam energy that strikes said at least one reflective optical surface is reflected toward said propellant tube for absorption.

8. The vehicle according to claim 6, wherein said mechanism comprises at least one heat conducting plate coupled to said propellant tube, said at least one heat conducting plate configured so that any beam energy that strikes said at least one heat conducting plate is absorbed by the heat conducting plate and thermally conducted to said propellant tube for absorption.

9. The vehicle according to claim 8 wherein said at least one heat conducting plate further comprises at least one heat pipe for thermally conducting beam energy to said propellant tube.

10. The vehicle according to claim 6, wherein the spacing between adjacent tubes of said plurality of propellant tubes is based on:
a determination of a total beam energy, along each of a plurality of straight paths across said beam receiving surface of said heat exchanger, as a function of a lateral position of each of the plurality of straight paths with respect to said heat exchanger; and
an integration of the total beam energy from a first side of said heat exchanger to various points, x, along each of the straight paths across said beam receiving surface of said heat exchanger to obtain a cumulative distribution function that describes the total beam energy between the first side and point x.

11. The vehicle according to claim 6 wherein said vehicle comprises one of a rocket, an aircraft, and an unmanned aerial vehicle.

12. A propellant heat exchanger comprising:
a beam receiver;
a plurality of propellant tubes accessible via said beam receiver, said plurality of propellant tubes oriented along a beam receiving surface of said heat exchanger such that a spacing between adjacent tubes of said plurality of propellant tubes varies along said beam receiving surface; and
at least one device associated with each said propellant tube in combination, said at least one device operable for transferring beam energy to said propellant tube, said plurality of propellant tubes and the associated said at least one device oriented along said beam receiving surface within said heat exchanger such that each combination of each said propellant tube and the corresponding said at least one device is configured to receive a substantially equal amount of beam energy via said beam receiver, wherein the plurality of propellant tubes are configured to channel a propellant therethrough to facilitate heating the propellant, with the beam enemy, to produce a hot propellant exhaust in an engine nozzle.

13. The propellant heat exchanger according to claim 12 wherein said at least one device comprises at least one reflective optical surface configured so that any beam energy that strikes thereon is reflected toward said propellant tube associated therewith for absorption of the beam energy.

14. The propellant heat exchanger according to claim 12 wherein said at least one device comprises at least one heat conducting plate configured so that any beam energy that strikes thereon is thermally conducted to said propellant tube associated therewith for absorption of the beam energy.

15. The propellant heat exchanger according to claim 12 wherein the spacing of each said propellant tube and said at least one device associated therewith is based on a determination of a total beam energy, along each of a plurality of straight paths across said beam receiving surface of said heat exchanger, as a function of a lateral position of each of the plurality of straight paths in said heat exchanger and an integration of the total beam energy from a first side of said heat exchanger to various points, x, along each of the plurality of straight paths across said beam receiving surface of said heat exchanger to obtain a cumulative distribution function that describes the total beam energy between the first side and the various points x.

16. The propellant heat exchanger according to claim 12 wherein:
said beam receiver comprises one of a circular or oval shape; and
said propellant tubes comprise curved paths for placement within the circular or oval shape defined by said beam receiver.

17. The method according to claim 1, wherein positioning the plurality of propellant tubes along the beam receiving surface of the propellant heat exchanger further comprises positioning a number of propellant tubes in a center portion of the beam receiving surface that is higher than a number of propellant tubes placed in each of opposing end portions of the beam receiving surface.

18. The vehicle according to claim 6, wherein the spacing of said plurality of propellant tubes causes a number of propellant tubes that are placed in a center portion of said beam receiving surface to be higher than a number of propellant tubes placed in each of opposing end portions of said beam receiving surface.

19. The vehicle according to claim 6, wherein each propellant tube of said plurality of propellant tubes transfers a substantially similar amount of beam energy to the propellant flowing therethrough such that a temperature of the propellant exiting any one of said plurality of propellant tubes is substantially similar to the temperature of the propellant exiting any other of said plurality of propellant tubes.

20. The propellant heat exchanger according to claim 12, wherein the spacing of said plurality of propellant tubes causes a number of propellant tubes that are placed in a center portion of said beam receiving surface to be higher than a number of propellant tubes placed in each of opposing end portions of said beam receiving surface.

* * * * *